(12) United States Patent
Olgaard (10) Patent No.: US 7,962,823 B2
(45) Date of Patent: Jun. 14, 2011

(54) SYSTEM AND METHOD FOR TESTING MULTIPLE PACKET DATA TRANSMITTERS

(75) Inventor: Christian Volf Olgaard, Sunnyvale, CA (US)

(73) Assignee: LitePoint Corporation, Sunnyvale, CA (US)

( * ) Notice: Subject to any disclaimer, the term of this patent is extended or adjusted under 35 U.S.C. 154(b) by 1042 days.

(21) Appl. No.: 11/696,921

(22) Filed: Apr. 5, 2007

(65) Prior Publication Data

US 2008/0172588 A1    Jul. 17, 2008

Related U.S. Application Data

(63) Continuation-in-part of application No. 11/422,475, filed on Jun. 6, 2006, now Pat. No. 7,484,146, and a continuation-in-part of application No. 11/422,489, filed on Jun. 6, 2006, now Pat. No. 7,567,521.

(51) Int. Cl.
*G01R 31/28* (2006.01)
*G01R 31/26* (2006.01)
*G11C 29/00* (2006.01)
*G06F 11/00* (2006.01)
*G06F 13/00* (2006.01)
*G06F 13/28* (2006.01)

(52) U.S. Cl. ......... 714/742; 714/724; 365/201; 711/100

(58) Field of Classification Search .................. None
See application file for complete search history.

(56) References Cited

U.S. PATENT DOCUMENTS

| 4,364,080 A | 12/1982 | Vidovic |
| 5,335,010 A | 8/1994 | Lindemeier et al. |
| 5,603,113 A | 2/1997 | De Loe, Jr. |
| 6,034,948 A * | 3/2000 | Nakamura et al. ............ 370/246 |
| 6,229,808 B1 | 5/2001 | Teich et al. |
| 6,442,163 B1 | 8/2002 | Chopping |
| 6,480,489 B1 | 11/2002 | Muller et al. |
| 6,532,357 B1 | 3/2003 | Ichikawa |
| 6,714,985 B1 | 3/2004 | Malagrino et al. |

(Continued)

FOREIGN PATENT DOCUMENTS

KR    10-2002-0006152 A    1/2002

OTHER PUBLICATIONS

Leung, S. ; Postula, A. ; Hemani, A., Test strategies on functionally partitioned module-based programmable architecture for base-band processing, 2001, Digital Systems, Design, 2001. Proceedings. Euromicro Symposium on Symposium, Print ISBN: 0-7695-1239-9, on p. 326.*

(Continued)

*Primary Examiner* — Cynthia Britt
*Assistant Examiner* — Guerrier Merant
(74) *Attorney, Agent, or Firm* — Vedder Price, P.C.

(57) ABSTRACT

A system and method for testing a plurality of packet data transmitters in which multiple devices-under-test (DUTs) are tested by providing similar transmit data streams to the DUTs each of which, in response thereto, provides a respective packet data signal. At least a portion of each packet data signal is captured to provide captured data packets, which are processed to provide multiple sets of test data respective ones of which, in turn, are analyzed in view of the transmit data to determine an operational status of each DUT.

10 Claims, 7 Drawing Sheets

U.S. PATENT DOCUMENTS

| | | |
|---|---|---|
| 6,775,240 B1* | 8/2004 | Zhang et al. ............... 370/251 |
| 6,779,050 B2 | 8/2004 | Horton et al. |
| 6,781,992 B1 | 8/2004 | Rana et al. |
| 6,785,239 B1 | 8/2004 | Tasker |
| 6,950,442 B2 | 9/2005 | Chai et al. |
| 6,963,572 B1 | 11/2005 | Carr et al. |
| 7,126,515 B1 | 10/2006 | Kris |
| 7,484,146 B2 | 1/2009 | Olgaard et al. |
| 7,567,521 B2 | 7/2009 | Olgaard et al. |
| 2001/0010751 A1 | 8/2001 | Amino et al. |
| 2002/0031125 A1 | 3/2002 | Sato et al. |
| 2002/0105947 A1 | 8/2002 | Kitagawa et al. |
| 2003/0119463 A1 | 6/2003 | Lim |
| 2004/0133733 A1 | 7/2004 | Bean et al. |
| 2004/0198257 A1 | 10/2004 | Takano et al. |
| 2005/0208910 A1 | 9/2005 | Burns et al. |
| 2005/0243743 A1 | 11/2005 | Kimura |
| 2005/0281232 A1 | 12/2005 | Kim et al. |
| 2006/0106946 A1 | 5/2006 | Agarwal et al. |
| 2006/0220742 A1 | 10/2006 | Manku |
| 2007/0070691 A1 | 3/2007 | Walvis et al. |
| 2007/0070881 A1* | 3/2007 | Olgaard et al. ............... 370/208 |
| 2007/0071034 A1 | 3/2007 | Fleming |
| 2007/0177520 A1 | 8/2007 | Morinaga et al. |
| 2007/0280196 A1 | 12/2007 | Olgaard et al. |
| 2007/0294378 A1 | 12/2007 | Olgaard et al. |
| 2008/0026748 A1* | 1/2008 | Alexander et al. ......... 455/432.1 |
| 2008/0172588 A1 | 7/2008 | Olgaard |
| 2008/0181125 A1 | 7/2008 | Imai |
| 2008/0298271 A1 | 12/2008 | Morinaga et al. |

OTHER PUBLICATIONS

International Search Report for PCT/US08/56827, dated Jun. 23, 2008, 3 pages.
Written Opinion for PCT/US08/56827, dated Jun. 23, 2008, 6 pages.
U.S. Appl. No. 60/596,444, filed Sep. 23, 2005, entitled "Method For Simultaneous Testing of Multiple Orthogonal Frequency Division Multiplexed Transmitters With Single Vector Signal Analyzer."
Written Opinion corresponding to International Application No. PCT/US2007/067853, dated Jun. 6, 2008, 4 pages.
International Search Report corresponding to International Application No. PCT/US2007/067853, dated Jun. 6, 2008, 3 pages.
Written Opinion corresponding to International Application No. PCT/US2007/067856, dated Sep. 18, 2008, 5 pages.
International Search Report corresponding to International Application No. PCT/US2007/067856, dated Sep. 18, 2008, 4 pages.
Mexican Office Action dated Mar. 15, 2011 for Mexican Patent Application No. MX/a/2009/010601, 7 pages.
Chinese Office Action dated Dec. 14, 2010 for Application No. 200780026709.7, 5 pages.
International Search Report for PCT/US2010/028990, filed Mar. 29, 2010, 4 pages.
Written Opinion of the International Searching Authority for PCT/US2010/028990, filed Mar. 29, 2010, 4 pages.

\* cited by examiner

| DUT1 | 1001 | 1002 | 1003 | 1004 | 1005 | 1006 |
|---|---|---|---|---|---|---|
| DUT2 | 2001 | 2002 | 2003 | 2004 | 2005 | 2006 |
| DUT3 | 3001 | 3002 | 3003 | 3004 | 3005 | 3006 |
| DUT4 | 4001 | 4002 | 4003 | 4004 | 4005 | 4006 |
| A | 1001a | 2002a | 3003a | 4004a | 1005a | 2006a |
| B | 1001b | 1002b | 2003b | 2004b | 3005b | 3006b |

FIG. 10A

| DUT1 | 1011 | 1012 | 1013 | 1014 | 1015 | 1016 |
|---|---|---|---|---|---|---|
| DUT2 | | 2011 | 2012 | 2013 | 2014 | 2015 |
| DUT3 | 3011 | 3012 | 3013 | 3014 | 3015 | 3016 |
| DUT4 | | | | | | 4011 |

| A | 1011a | 2012a | 3014a | 4011a |
|---|---|---|---|---|

FIG. 10B

| | | | | | | |
|---|---|---|---|---|---|---|
| DUT1 | N-1 1101 | N 1102 | N+1 1103 | N+2 1104 | N+3 1105 | N+4 1106 |
| DUT2 | N-3 2101 | N-2 2102 | N-1 2103 | N 2104 | N+1 2105 | N+2 2106 |
| DUT3 | N-1 3101 | N 3102 | N+1 3103 | N+2 3104 | N+3 3105 | N+4 3106 |
| DUT4 | N 4101 | N+1 4102 | N+2 4103 | N+3 4104 | N+4 4105 | N+5 4106 |

| A | 1104a | 2105a | 3106a | | | |
|---|---|---|---|---|---|---|
| B | 1102b | 2104b | 3105b | 4106b | | |
| C | 4101c | 1102c | 3103c | 2104c | 4105c | 1106c |

FIG. 10C

SYSTEM AND METHOD FOR TESTING MULTIPLE PACKET DATA TRANSMITTERS

RELATED APPLICATIONS

This is a continuation-in-part of U.S. patent application Ser. No. 11/422,475, filed Jun. 6, 2006, and entitled "Apparatus for Capturing Multiple Data Packets In a Data Signal for Analysis", and a continuation-in-part of U.S. patent application Ser. No. 11/422,489, filed Jun. 6, 2006, and entitled "Method for Capturing Multiple Data Packets In a Data Signal for Analysis".

BACKGROUND OF THE INVENTION

1. Field of the Invention

The present invention relates to systems and methods for testing packet data transmitters, and in particular, to systems and methods for testing multiple packet data transmitters contemporaneously.

2. Related Art

Increasingly, many well-known and popular data communications systems communicate via digital data signals in which the data is distributed among a number of data packets which are transmitted sequentially and then reassembled within the receiver, often following transmission along various distinct signal paths (e.g., as is done with the Internet). Conventional test equipment for measuring these data signals capture these data packets, store them and then transfer them for analysis. Often, the transfer and analysis of the captured data takes longer than the process by which they are captured from within the data signal, in part because of the need to transfer the captured data to remote analysis circuitry (e.g., a computer separate from the test equipment). Consecutive data packets are often closely spaced, particularly within data signals being transmitted at high data rates. Accordingly, conventional test equipment will often not measure consecutive packets, but instead will capture non-adjacent packets spaced in time by an interval approximating the time needed for analysis or measurement.

However, it is often desirable to capture consecutive packets, e.g., to analyze power variations from one packet to another. To do this with conventional test equipment, it would generally be necessary to increase the time interval available for capturing the data packets, thereby causing the capture window to become equal to the duration of the number of consecutive data packets sought to be captured and analyzed. This, however, is disadvantageous due to the fact that increasing the capture window will also slow down the overall data capture and analysis operation, since more data will need to be transferred between the capture memory and analysis engine. Further, in many communication systems, the data packets are not closely spaced, which means that much of the captured data is unused since it corresponds to the gaps between consecutive data packets.

Also, in multiple-input, multiple-out (MIMO) systems with a single data analysis engine, such as is often done in a production test environment, time efficiency in capturing and analyzing data packets becomes even more important. As is well know, a MIMO system uses multiple transmitters operated in parallel. Testing one transmitter at a time requires that the overall system be maintained in a transmit state of operation longer, and thereby potentially affect its performance due to increased heat buildup. To effectively avoid this would require testing one transmitter, powering the unit down, waiting for it to stabilize in its off state, and then power the unit up again to test the next transmitter, and so on. As a result, overall test time would increase significantly.

Another issue with testing such devices in a production environment is optimizing test time to increase throughput. This is often done by pipelining the various tests so as to separate the testing into sufficiently small steps to ensure high usage of the test equipment involved. When doing this, however, it must be kept in mind that any testing of a device under test (DUT) involves at least four time intervals: initial control, or setup, of the DUT; settling time for the DUT; capturing of the test data from the DUT; and analysis of the captured test data. Of these time intervals, generally the time interval for DUT setup is the longest, e.g., often four to five times as long as each of the intervals for DUT settling, data capture, and data analysis. Accordingly, it would be desirable to have a system and method for optimizing DUT test time notwithstanding the significant time overhead for DUT setup. One technique which has been used is the transmission and capturing of multiple data packets. While this can be effective in reducing test time, it also requires special control functions for generating the different data packet streams needed for the analysis.

SUMMARY OF THE INVENTION

In accordance with the presently claimed invention, a system and method provide for testing a plurality of packet data transmitters in which multiple devices-under-test (DUTs) are tested by providing similar transmit data streams to the DUTs each of which, in response thereto, provides a respective packet data signal. At least a portion of each packet data signal is captured to provide captured data packets, which are processed to provide multiple sets of test data respective ones of which, in turn, are analyzed in view of the transmit data to determine an operational status of each DUT.

In accordance with one embodiment of the presently claimed invention, a system for testing a plurality of packet data transmitters includes:

a plurality of device-under-test (DUT) controllers each of which is programmed to provide, responsive to a plurality of control data, a respective one of multiple pluralities of transmit data to a respective one of a plurality of DUTs and further programmed to analyze a respective one of multiple pluralities of test data related to the respective one of multiple pluralities of transmit data, wherein the plurality of DUTs, responsive to the multiple pluralities of transmit data, provides a plurality of packet data signals each of which contains at least a portion of a respective one of the multiple pluralities of transmit data;

a data signal capturing system responsive to a reception of the plurality of packet data signals by capturing at least a portion of each one of the plurality of packet data signals to provide a plurality of captured data packets; and a master controller coupled to the data signal capturing system and the plurality of DUT controllers, and programmed to provide the plurality of control data and to process the plurality of captured data packets to provide the multiple pluralities of test data;

wherein each one of the plurality of DUT controllers determines an operational status of the respective one of the plurality of DUTs based upon the analysis of the respective one of the multiple pluralities of test data in view of the respective one of the multiple pluralities of transmit data.

In accordance with another embodiment of the presently claimed invention, a system for testing a plurality of packet data transmitters includes:

device-under-test (DUT) controller means for providing, responsive to a plurality of control data, a respective one of multiple pluralities of transmit data to a respective one of a plurality of DUTs and for analyzing a respective one of multiple pluralities of test data related to the respective one of multiple pluralities of transmit data, wherein the plurality of DUTs, responsive to the multiple pluralities of transmit data, provides a plurality of packet data signals each of which contains at least a portion of a respective one of the multiple pluralities of transmit data;

data signal capturing means for responding to a reception of the plurality of packet data signals by capturing at least a portion of each one of the plurality of packet data signals to provide a plurality of captured data packets; and master controller means for providing the plurality of control data and processing the plurality of captured data packets to provide the multiple pluralities of test data;

wherein the DUT controller means determines an operational status of the respective one of the plurality of DUTs based upon the analysis of the respective one of the multiple pluralities of test data in view of the respective one of the multiple pluralities of transmit data.

In accordance with another embodiment of the presently claimed invention, a system for testing a plurality of packet data transmitters includes:

a data signal capturing system responsive to a reception of a plurality of packet data signals by capturing at least a portion of each one of the plurality of packet data signals to provide a plurality of captured data packets; and a controller programmed to provide respective ones of multiple pluralities of transmit data to respective ones of a plurality of DUTs, to process the plurality of captured data packets to provide multiple pluralities of test data related to the respective ones of multiple pluralities of transmit data, and to analyze respective ones of the multiple pluralities of test data;

wherein the plurality of DUTs, responsive to the multiple pluralities of transmit data, provides the plurality of packet data signals each of which contains at least a portion of a respective one of the multiple pluralities of transmit data, and the controller determines an operational status of each one of the plurality of DUTs based upon the analysis of the respective one of the multiple pluralities of test data in view of the respective one of the multiple pluralities of transmit data.

In accordance with another embodiment of the presently claimed invention, a system for testing a plurality of packet data transmitters includes:

data signal capturing means for responding to a reception of a plurality of packet data signals by capturing at least a portion of each one of the plurality of packet data signals to provide a plurality of captured data packets; and controller means for providing respective ones of multiple pluralities of transmit data to respective ones of a plurality of DUTs, for processing the plurality of captured data packets to provide multiple pluralities of test data related to the respective ones of multiple pluralities of transmit data, and for analyzing respective ones of the multiple pluralities of test data;

wherein the plurality of DUTs, responsive to the multiple pluralities of transmit data, provides the plurality of packet data signals each of which contains at least a portion of a respective one of the multiple pluralities of transmit data, and the controller means determines an operational status of each one of the plurality of DUTs based upon the analysis of the respective one of the multiple pluralities of test data in view of the respective one of the multiple pluralities of transmit data.

In accordance with another embodiment of the presently claimed invention, a method for testing a plurality of packet data transmitters includes:

providing respective ones of multiple pluralities of transmit data for respective ones of a plurality of devices-under-test (DUTs);

providing, with the plurality of DUTs in response to the multiple pluralities of transmit data, a plurality of packet data signals each of which contains at least a portion of a respective one of the multiple pluralities of transmit data;

capturing at least a portion of each one of the plurality of packet data signals to provide a plurality of captured data packets;

processing the plurality of captured data packets to provide multiple pluralities of test data each of which is related to a respective one of the multiple pluralities of transmit data; and analyzing respective ones of the multiple pluralities of test data in view of respective ones of the multiple pluralities of transmit data to determine an operational status of respective ones of the plurality of DUTs.

DETAILED DESCRIPTION

The following detailed description is of example embodiments of the presently claimed invention with references to the accompanying drawings. Such description is intended to be illustrative and not limiting with respect to the scope of the present invention. Such embodiments are described in sufficient detail to enable one of ordinary skill in the art to practice the subject invention, and it will be understood that other embodiments may be practiced with some variations without departing from the spirit or scope of the subject invention.

Throughout the present disclosure, absent a clear indication to the contrary from the context, it will be understood that individual circuit elements as described may be singular or plural in number. For example, the terms "circuit" and "circuitry" may include either a single component or a plurality of components, which are either active and/or passive and are connected or otherwise coupled together (e.g., as one or more integrated circuit chips) to provide the described function. Additionally, the term "signal" may refer to one or more currents, one or more voltages, or a data signal. Within the drawings, like or related elements will have like or related alpha, numeric or alphanumeric designators. Further, while the present invention has been discussed in the context of implementations using discrete electronic circuitry (preferably in the form of one or more integrated circuit chips), the functions of any part of such circuitry may alternatively be implemented using one or more appropriately programmed processors, depending upon the signal frequencies or data rates to be processed.

Figure 1:
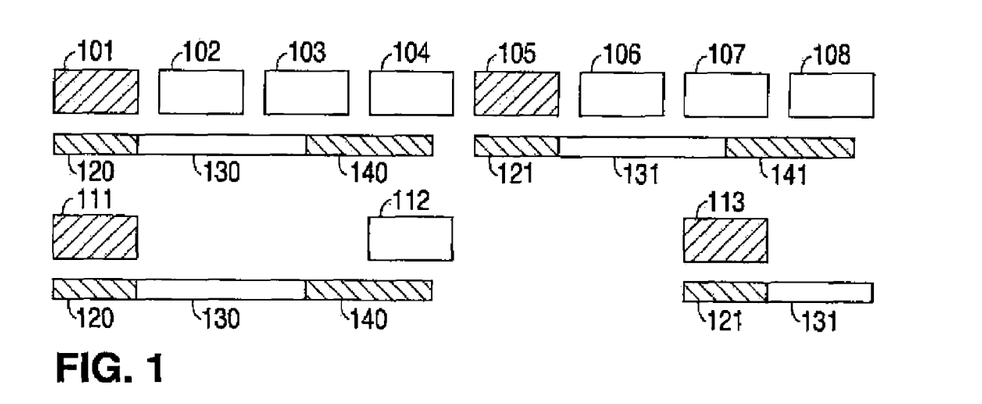
FIG. 1 is a diagram depicting a conventional method of capturing and analyzing data packets.

Referring to FIG. 1, conventional test equipment typically triggers on a signal and captures data packets following such triggering event. After the data has been captured and stored in memory, it is generally transferred to a separate analysis circuit either within the test equipment or to remote analysis circuitry, e.g., a personal computer for analysis and display of the results. For example, for a series of data packets 101-108 received from the signal source, i.e., the device under test (DUT), the duration of the capture interval 120 is typically substantially equal to the duration of a single data packet. The captured data packet is transferred during internal 130 to the analysis portion of the test equipment where it is analyzed during interval 140, and possibly displayed. While it may be possible that the system is available for further data capture following the transfer interval 130, generally some data validity testing is required before further data capture can begin, as represented by interval 140. In any event, even if this further delay 140 is not necessary, the next data capture interval 121 cannot begin until completion of the analysis interval 140, thereby preventing the capturing of closely spaced consecutive data packets. Hence, it will only be possible to capture widely spaced, and often non-consecutive, data packets 101, 105 due to these necessary delays. If the data packets are more widely spaced, such as data packets 111, 112 and 113, fewer packets will be missed between those that are captured.

Further, the capture 120, transfer 130 and analysis 140 intervals are not necessarily shown to scale, and the data transfer interval 130 is often significantly longer than the duration of the data packet being captured. This is particularly true for systems having large bandwidths, e.g., where very high data sampling ratios are needed, thereby requiring a large amount of data to be collected when sampling even relatively short data packets. In such instances, for all data packets to be analyzed, the packets must be spaced widely in time, thereby causing the system to be operated for testing in a mode in which the DUT is not normally operated.

Further still, it is often desirable to capture consecutive data packets so as to analyze short term changes in the system operation. Accordingly, it is then necessary to increase the data capture interval. Additionally, it is often desirable in production test environments to use statistical analyses of the test data to determine the performance characteristics. Having consecutive data packets facilitates analyses of system variations, such as power control operation of a code division multiple access (CDMA) transmitter where signal power is often variable. Similar power control methods are used in other forms of wireless signal communication, and it is often desirable to know if the power being analyzed is at its maximum or minimum level before analyzing the captured data packets, since data transmission quality often depends upon the actual signal transmission power (e.g., signal compression in the transmitter often affects the quality of the transmitted signal).

Figure 2:
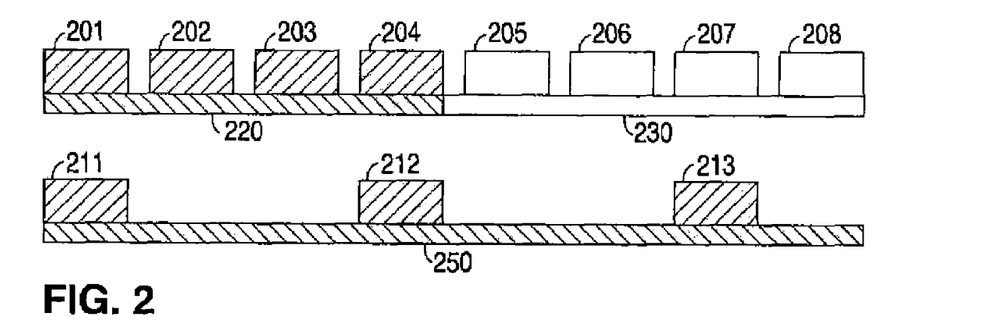
FIG. 2 is a diagram depicting another conventional method of capturing and analyzing data packets.

Referring to FIG. 2, a conventional system for capturing and analyzing consecutive data packets 201, 202, 203, 204 relies upon an increased data capture interval 220 to span the interval that includes the desired data packets. Accordingly, the amount of data captured will increase by an amount equal to the captured data packets plus the intervening time intervals, or gaps, by which the data packets are separated. As a result, the transfer interval 230 also increases significantly.

In those instances where the data packets 211, 212, 213 are more widely spaced, the data capture interval 250 increases by a correspondingly significant amount as well, as will the transfer interval (not shown), thereby significantly slowing the operation of the test equipment as well as increasing the required amount of data capture memory within and, therefore, the cost of, the test equipment.

Figure 3A:
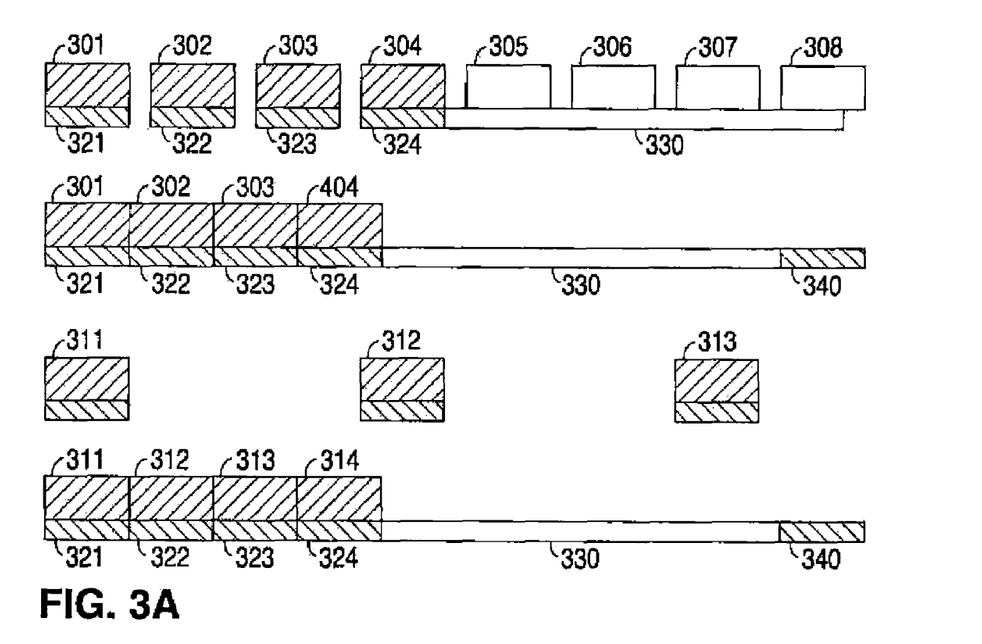
FIG. 3A is a diagram depicting a method of capturing data packets for analysis in accordance with one embodiment of the presently claimed invention.

Referring to FIG. 3A, in accordance with the presently claimed invention, a number of programmable trigger events are used for capturing the data packets, rather than using a single trigger for each data capture. For example, with closely spaced data packets 301-308 a trigger sequence can be programmed to capture four consecutive packets 301-304 during data capture intervals 321-324. The duration of each capture interval 321-324 is preferably equal to the duration of each corresponding data packet 301-304. This advantageously packs the four data packets together by avoiding the capturing of effectively null data associated with the time intervals between the actual data packets 301-304. Accordingly, the transfer time 330 for the captured data is reduced. This reduction in the captured data transfer time 330, relative to the overall time interval during which the incoming data packets arrive, improves significantly as the incoming data packets 311-313 are spaced further apart. In other words, for data packets 311-313 having durations equal to the corresponding closely spaced data packets 301-304, notwithstanding the longer durations of the time intervals between such data packets 311-313, the resulting data capture intervals 321-324 remain the same (this includes capture of an incoming data packet 314 not shown due to space limitations within the drawing), as does the data transfer interval 330. However, relative to the overall time needed for the incoming data packets 311-314 to arrive, the data transfer interval 330 is significantly reduced. In any event, regardless of whether the incoming data packets are closely spaced or widely spaced, the data transfer time can be optimized and remain independent of the time interval for the stream of incoming data packets.

Figure 3B:
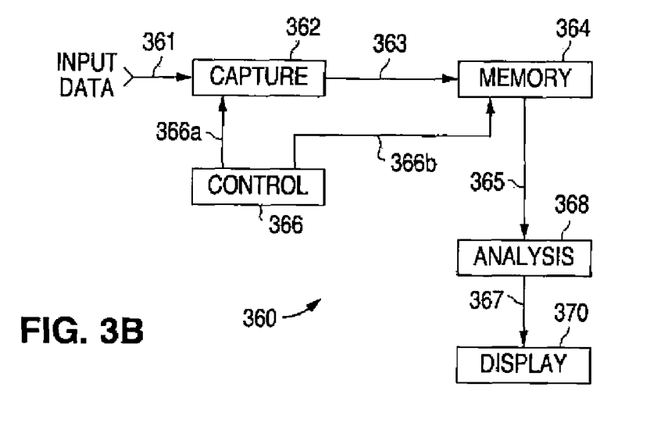
FIG. 3B is a functional block diagram of a test system in which a method in accordance with the presently claimed invention can be practiced.

Referring to FIG. 3B, one example of a system 360 for capturing data packets for analysis in accordance with the presently claimed invention includes data capture circuitry 362 (e.g., sample-and-hold circuitry and analog-to-digital signal conversion circuitry) for capturing the incoming data stream 361. The captured data 363 is stored in memory 364. Control circuitry 366 controls the capture circuitry 362 and memory 364 via control signals 366a, 366b. The captured data 365 is retrieved from the memory 364 and transferred to analysis circuitry 368 (e.g., a microprocessor and associated support circuitry) either locally within the test equipment or remotely in an external computer, all of which are well known in the art. The results 367 of the data analysis can then be made available for viewing on a display 370 by the user (not shown). In normal operation, data packets tend to be separated by longer time intervals than those typically used for production testing, since it is desirable to minimize time necessary for such testing. However, this can result in test results which are not truly indicative of circuit operation during normal use. One way to address this is to further reduce the data transfer 330 and data analysis 340 intervals (FIG. 3A) relative to the time interval needed for the arrival of the incoming data packets 301-304.

In many instances, it may not be necessary to capture each entire data packet. For example, in the IEEE 802.11a wireless data standard, it is specified that transmit quality is to be measured over a minimum of 16 data symbols. While data packets are generally longer than 16 symbols, it is only necessary to capture 16 symbols of each packet to perform the test according to the standard. Another option is to measure the power of orthogonal frequency division multiplex (OFDM) signals according to the standard. The RMS power can be measured by measuring the training symbol of the data packet (e.g., typically 8-16 microseconds into the packet), thereby requiring that only 16 microseconds of each data packet be captured for power measurement.

Figure 4:
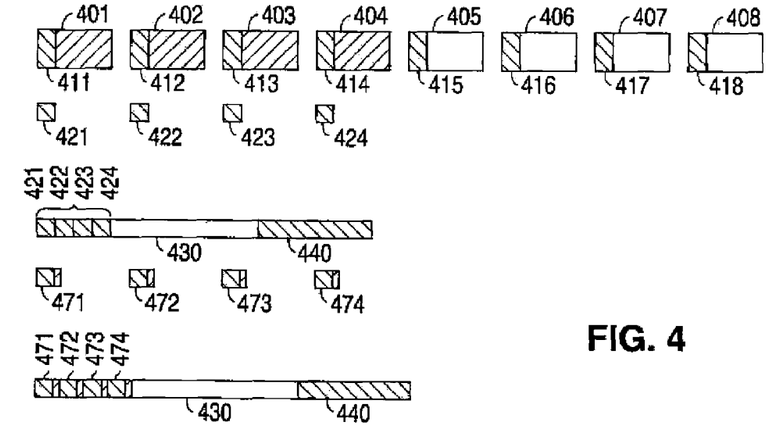
FIG. 4 is a diagram depicting a method of capturing data packets for analysis in accordance with another embodiment of the presently claimed invention.

Referring to FIG. 4, this can be done by capturing selected portions 411-414 of the incoming data packets 401-404 during corresponding data capture intervals 421-424. By reducing the capture time in this way, the amount of captured data for the four consecutive data packets 421-424 will be reduced, particularly when this captured data is packed in a consecutive manner prior to the data transfer interval 430. Similarly, the data analysis interval 440 will also be reduced.

Alternatively, in addition to the captured data 421-424, small data separator packets 471-474 can be introduced following each corresponding portion of captured data. This can have the effect of simplifying subsequent analysis of the data, since the system may more easily identify the start or end of each portion 421-424 of captured data. The additional overhead data to be transferred, as a result of this, will depend upon the size of the data separator packets 471-474.

As a further alternative, as opposed to introducing data separator packets 421-424, the captured data can also be encoded with a marker signal, e.g., as the least significant bit of the captured data or in a separate data bit. This can reduce or even eliminate the additional overhead data otherwise introduced by the data separator packets 471-472.

Another advantage of using limited data capture times is related to the capture of multiple data packets. For example, when capturing multiple data packets, each data packet in the stream may be different. Capturing multiple data packets allows for the capture, in a single capture sequence, of one of each type of data packet used. This can advantageously reduce test time, since all results for a single frequency can be obtained in a single data capture sequence. Further, analysis of the captured data can be optimized by reducing the data for each packet to be equal to the longest required data capture. For example, transmission of multiple data packets may result in packets of different lengths being transmitted, as the drivers used to produce the packets may use a fixed data amount per packet, with the durations becoming longer with lower data rates. However, even if the duration does become longer, only the predetermined capture time need be used, e.g., the first 16 symbols for a system based upon the IEEE 802.11a OFDM standard. While the symbol rate remains constant, the modulation used for this symbol will change the data rate, as is commonly done to simplify implementations. Using a fixed capture time for each data packet can significantly improve analysis of multiple data packets.

In the discussion above, it has been assumed that the system triggers at the beginning of each data packet. However, it should be understood that a predetermined delay can be introduced in the trigger so as to initiate data capture at a later point in each data packet. For example, in a IEEE 802.11a OFDM signal, when seeking to capture data from eight to 16 microseconds within the data packet, a delay of eight microseconds can be introduced to delay the triggering of the data capture.

When testing the multiple transmitters of a MIMO system, it may be desirable to use multiple parallel receivers such that the data packets can be captured and analyzed in parallel. However, test equipment having parallel receivers can be cost prohibitive for purposes of production testing. One alternative to the need for parallel testing is to use a composite signal analysis as proposed in U.S. Provisional Patent Application No. 60/596,444, filed Sep. 23, 2005, and entitled "Method for Simultaneous Testing of Multiple Orthogonal Frequency Division Multiplexed Transmitters with Single Vector Signal Analyzer", the disclosure of which is incorporated herein by reference. Such a composite analysis involves the combining of the multiple transmit signals into a single signal, e.g., via a signal power combiner, so that a single receiver can be used to analyze the composite signal.

Such a composite signal analysis technique requires some method by which the coupling between the transmitters can be identified or analyzed so as to determine the origin of the signal being analyzed. Additionally, it is important that the data within the packet being analyzed be known. While this is more easily done in a production test environment, it nonetheless requires special drivers for the transmitter.

In accordance with another embodiment of the presently claimed invention, these issues can be addressed by introducing signal switching circuitry which allows the individual transmitter signals to be isolated for analysis. This will allow testing of coupling between the transmitters, and, in those instances where coupling is not significant, allow for error vector magnitude (EVM) measurements for individual transmitted data packets from the individual transmitters. However, simply introducing switching circuitry will likely affect test time, since after capturing one or more data packets from one transmitter some delay will be introduced as the switches provide for transmission of the signal from another transmitter. Such delays may be significant, depending upon the production test environment.

Figure 5A:
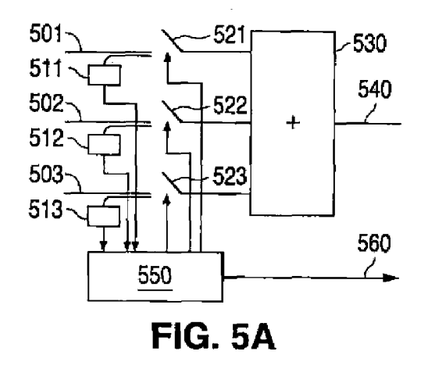
FIGS. 5A and 5B are functional block diagrams of signal switching circuits for capturing data packets for analysis in accordance with additional embodiments of the presently claimed invention.
Figure 5B:
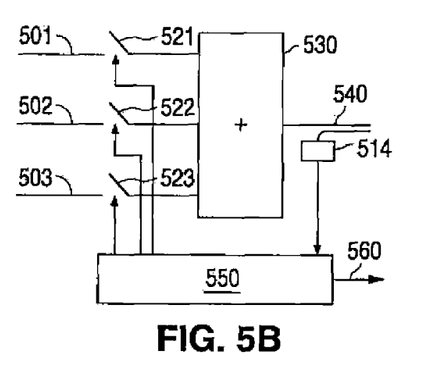

Referring to FIGS. 5A and 5B, testing problems associated with such delays can be minimized or avoided by using one or both of the switching systems shown. (These examples provide for the switching among three transmitter inputs 501, 502, 503; however, it should be understood that these implementations can be extended to handle additional input signals.) This circuitry includes a power combiner 530 to combine the various input signals 501, 502, 503, received via respective signal switches 521, 522, 523, into a single signal 540 to be fed to the test equipment. Such signal switches 521, 522, 523 are well known in the art and have fast switching times, e.g., relative to the signal frequencies and data rates. Further, such signal switches 521, 522, 523 are preferably solid state switches, and can be implemented as multiple switches in series or parallel, as needed or desired, to provide the desired isolation between the transmitters (not shown) and the power combiner 530, as well as appropriate termination impedance so as to allow the power combiner 530 to sum the different input signals correctly. Further still, as will be readily appreciated by one of ordinary skill in the art, such signal switches 521, 522, 523 can be implemented as programmable attenuators (various types of which are well known in the art) controlled by the control signals from the control circuit 550. Accordingly, a "closed" switch can be realized by programming the appropriate switch to have a very low, e.g., approximately zero, attenuation value, while an "open" switch can be realized by programming the appropriate switch to have a very high attenuation value. Such an implementation also advantageously allows intermediate attenuation values to be programmed when conveyance of the signal is desired but at a reduced power level. Alternatively, separate programmable attenuators (not shown) can be connected in serial with the switches 521, 522, 523 for separate control.

Referring to FIG. 5A, this implementation includes signal power detectors 511, 512, 513 for detecting the power of the respective input signals 501, 502, 503, with detected power signals being provided to a control circuit 550, which provides control signals for the input signal switches 521, 522, 523. This allows the control circuit 550 to determine the presence of a signal (e.g., based upon the amount of power indicated by the power detection signal) at each of the input terminals. Based upon these power indication signals, as well as the known states (e.g., open or closed) of the switches 521, 522, 523, the control circuit 550 generates a trigger signal 560 (e.g., based upon a programmable state machine inside the control circuit 550) to control the capturing by the test equipment (not shown) of the data packets received in the output signal 540 of the power combiner 530, as discussed above.

Alternatively, a single detector can be used, e.g., the first signal power detector 511 for the first received signal 501. With all DUT transmitters operating simultaneously in a similar manner, detection by this single detector 511 of the arrival of the data packet in the first received signal 501 will also indicate the arrival of the data packets in the remaining received signals 502, 503.

Referring to FIG. 5B, according to an alternative implementation, a single power detector 514 is used, instead of multiple input power detectors 511, 512, 513, to detect the power of the output signal 540 of the power combiner 530. As before, the control circuitry 550 knows the states of the input switches 521, 522, 523 and can thereby determine which input signal 501, 502, 503 is providing the output signal 540 via the power combiner 530.

While differing in their respective implementations, both of these circuits of FIGS. 5A and 5B provide the ability to switch among the input signals 501, 502, 503 in a known sequence during the time intervals between the respective data packets of the signals being tested. Accordingly, switching can occur after every data packet, after multiple data packets or after the desired amount of data has been captured (e.g., after capturing the desired first 16 symbols of a 32-symbol packet), as desired.

Figure 6:
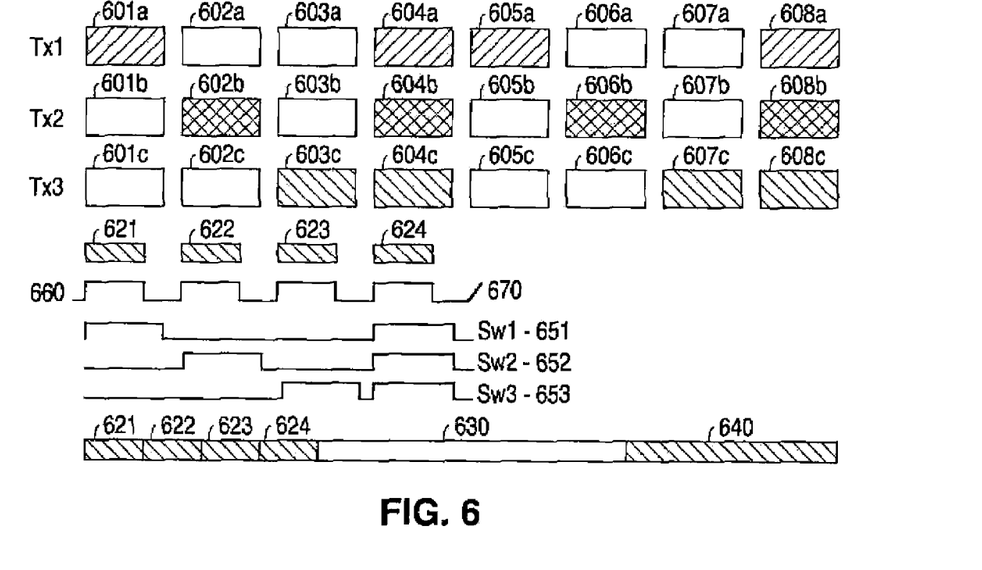
FIG. 6 is a diagram depicting a method of capturing data packets for analysis using the circuitry of FIGS. 5A and 5B.

Referring to FIG. 6, one possible method of operation of such a system includes the transmission of a stream of data packets 601-608, with each of the three transmitters transmitting a respective data stream 601a-608a, 601b-608b, 601c-608c. The control circuitry 550 (FIGS. 5A and 5B) selects the first transmitter output 601a, followed by the second transmitter output 602b, and the third transmitter output 603c. This is then followed by a selection of the outputs of all three transmitters 604a, 604b, 604c which are combined into a composite signal. Multiple triggering is used, as discussed above, to minimize the amount of data actually being captured, e.g., the data capture intervals 621, 622, 623, 624 need only be as long as necessary for capturing the desired amounts of each of the individual data packets 601a, 602b, 603c, and the sum of data packets 604a, 604b, 604c. As discussed above, this data is combined, e.g., packed in a sequence of captured data 621-624, transferred during transfer interval 630, and analyzed during analysis interval 640. The switch control signals 651, 652, 653 for the three signal switches 521, 522, 523 are also shown, as produced by the control circuit 550.

Alternatively, instead of the capturing of the data packet portions being controlled internally by the test instrument itself, the trigger signal 660 provided by the control circuit 550 can be used. This can be advantageous when multiple input signals are involved, such as when testing a MIMO system. This trigger signal 660 identifies the data packet capture intervals 621, 622, 623, 624 (e.g., where a high signal level corresponds to the data capture interval). The angled portion of the signal 670 at the end identifies an optional end of trigger sequence which allows the test instrument to terminate its capturing of data packets and initiate the data transfer, i.e., during the transfer interval 630. Alternatively, the data transfer interval 630 can be initiated following the capturing of the desired amount of data packets, e.g., four data packets as shown in this example.

As noted, controlling the triggering of data packet capturing with the control circuitry 550 can be advantageous. For example, when testing a MIMO system, the ordering of the data packets can be controlled, thereby ensuring that the first packet is from the first transmitter, the second packet is from the second transmitter, the third packet is from the third transmitter, and the last captured data is the combined signal from all transmitters. Controlling the data capturing with such a trigger signal should not introduce any problematic delays, since the receiver circuitry within the test equipment will typically use a high speed analog-to-digital converter having a pipeline design in which the delay (i.e., through the pipeline) is significantly longer than the time needed for an analog trigger signal to initiate the capturing of data. In the event that the trigger signal is derived in a digital manner, simple memory, or buffer, circuitry for storing the history of the signal can be used to ensure proper timing.

Figure 7:
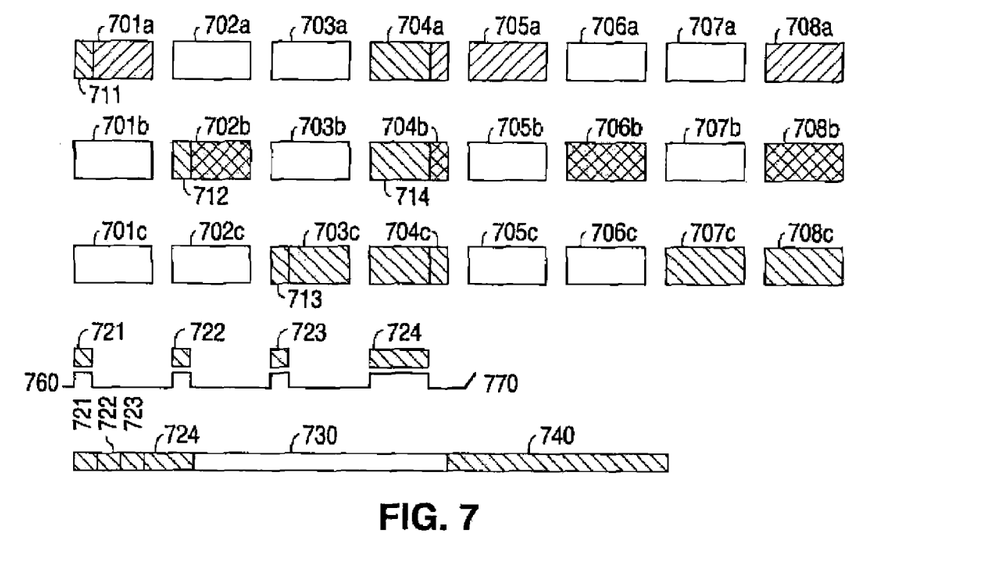
FIG. 7 is a diagram depicting another method for capturing data packets for analysis using the circuitry of FIGS. 5A and 5B.

Referring to FIG. 7, an alternative use of the control circuit 550 to generate the trigger 760 involves the capturing of small portions 711, 712, 713 of the respective data packets 701a, 702b, 703c, while still capturing a larger portion 714 of the combined data packets 704a, 704b, 704c. This would provide sufficient data capture to measure EVM of the first portions of the packets sent by the different transmitters, while maintaining the longer data packets to allow sufficient data capture in the case of the combined fourth data packets 704a, 704b, 704c, to allow for accurate spectral mask measurements. As a result, the captured data 721, 722, 723, 724, when packed for transferring during the transfer interval 730, is significantly shorter. Since the control circuitry 550 controls the different switches, it can be easily programmed to control the duration of the capture intervals such that the capturing of the portions 711, 712, 713 of the individual data packets 701a, 702b, 703c can be different, e.g., shorter, than the interval needed for capturing the portion 714 of the combined data packets 704a, 704b, 704c.

When testing a MIMO system, it may be necessary to use external hardware for synchronizing the duration of the data capture with the states of the respective switches (on and off), since the test equipment may not know when the appropriate packet type is being transmitted. However, it is also possible to introduce this type of synchronization within the test equipment when it is testing a signal transmitter. For example, it may be desirable to perform multiple power measurements for a IEEE 802.11a OFDM signal, followed by a spectral mask measurement. As discussed above, the power measurement may only need 6.4 microseconds, e.g., two consecutive 3.2-microsecond intervals beginning 8.8 microseconds after the beginning and ending 0.8 microsecond before the end of the 16-microsecond data packet preamble, while a spectral mask measurement may require a longer capture interval to provide reasonable power averaging. In any event, such timing synchronization can be implemented in any of many ways which are well known in the art.

As noted above in the discussion concerning the switching circuitry (FIGS. 5A and 5B), it can be difficult to test isolation between transmitters when testing composite signals. Such composite signal testing allows testing of power from individual transmitters, but the use of a signal combiner generally makes it difficult, if not impossible, to identify the origin of the power being measured. By adding switches to the input of the power combiner, it becomes possible to measure the coupling, so long as the isolation within the switches is better than the coupling level being tested.

Figure 8A:
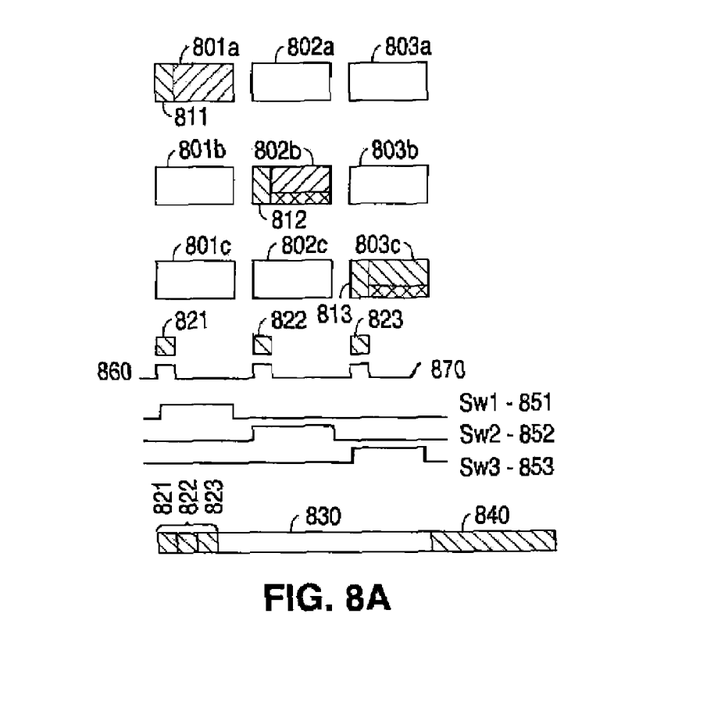
FIGS. 8A and 8B are diagrams depicting additional methods of capturing data packets for analysis using the circuitry of FIGS. 5A and 5B.

Referring to FIG. 8A, using a data packet testing technique as discussed above when testing a MIMO system can be described as follows: during transmission of the first data packet 801, the packet 801*a* from the first transmitter is conveyed to the power combiner 530 (FIGS. 5A and 5B). Similarly, during transmission of the second 802 and third 803 data packets, the data packets 802*b*, 803*c* from the second and third transmitters are conveyed to the power combiner 530. The appropriate switch settings are accomplished using the three switch control signals 851, 852, 853. Capturing of the desired portions 811, 812, 813 of the data packets 801*a*, 802*b*, 803*c* is done during time intervals 821, 822, 823 in accordance with the trigger control signal 860.

The data packet signal acquired during the first interval 821 contains power attributable only to the first transmitter. This capture interval is relatively short as the power coupling can be measured by composite measurement methods in the high throughput, long training sequence (HT-LTS) that appears at the beginning of the data packet. During the second capture interval 822, the captured signal includes primarily power from the second transmitter, but also some additional power due to coupling from the first transmitter data packet 802*a* into the second transmitter within the DUT. Using power analysis and composite measurement techniques (as discussed in Application No. 60/596,444, as noted above) the power attributed to the first transmitter data packet 802*a* can be determined. Similarly, following capture of the third data packet 803*c* during its data capture interval 823, power attributed to the first transmitter data packet 803*a* can also be determined. Further similarly, during the first data capture interval 821, power coupling attributed to the second transmitter data packet 801*b* and third transmitter data packet 801*c* can be determined, as well as power attributed to the first transmitter data packet 802*a* and third transmitter data packet 802*c* following the second data capture interval 822. Accordingly the transmitter power attributed to the transmitter of interest, as well as contributions from the other transmitters, can be determined.

Referring again to FIG. 7, it should now be understood that the desired information regarding the data signal transmission characteristics can be obtained during the first three data signal capture intervals 721, 722, 723, since the coupling between transmitters can be determined, and the last data capture interval 724 can be used to measure signal transmission quality and other parameters using the composite EVM techniques as described in Application No. 60/595,444, as noted above.

Figure 8B:
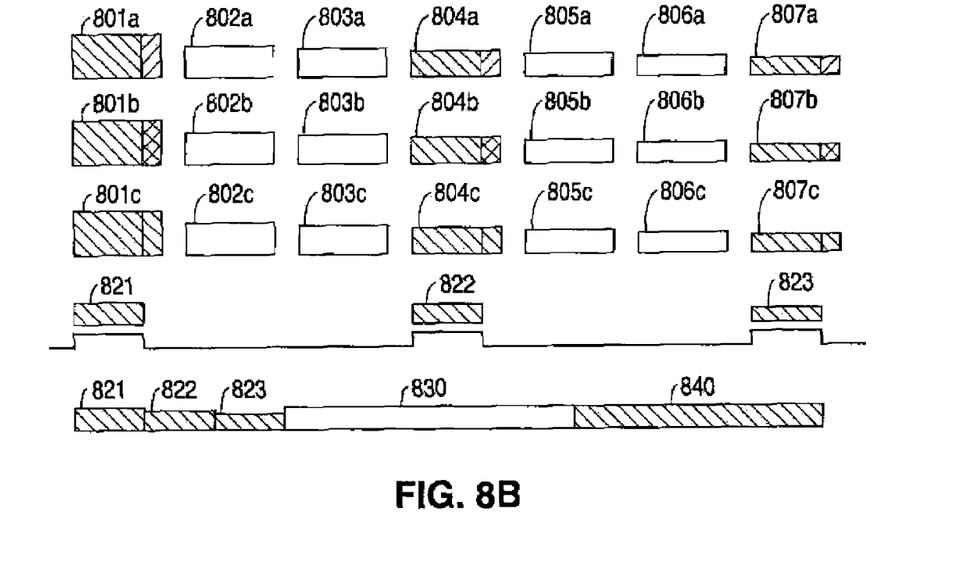

Referring to FIG. 8B, it should be further understood that, as an alternative, intermediate packets 802, 803, 805, 806 between the captured packets 801, 804, 807 can be skipped. For example, it may be necessary to allow the transmitter being tested to settle, e.g., in terms of frequency and power. This can be implemented by simply counting the number of packets that are measured before initiating capturing of data packets. This is particularly useful when testing multiple packets. For example, it may be desirable to transmit different power levels for purposes of calibration or other tests. If the transmitter requires some time for settling, a first number of packets can be transmitted at one power level, following which the power level is changed and a second number of packets are transmitted. In such cases, it may be desirable to transmit the majority of such number of packets prior to capturing one or more of such packets at the end before the power level changes for the next data packet transmission.

Figure 9A:
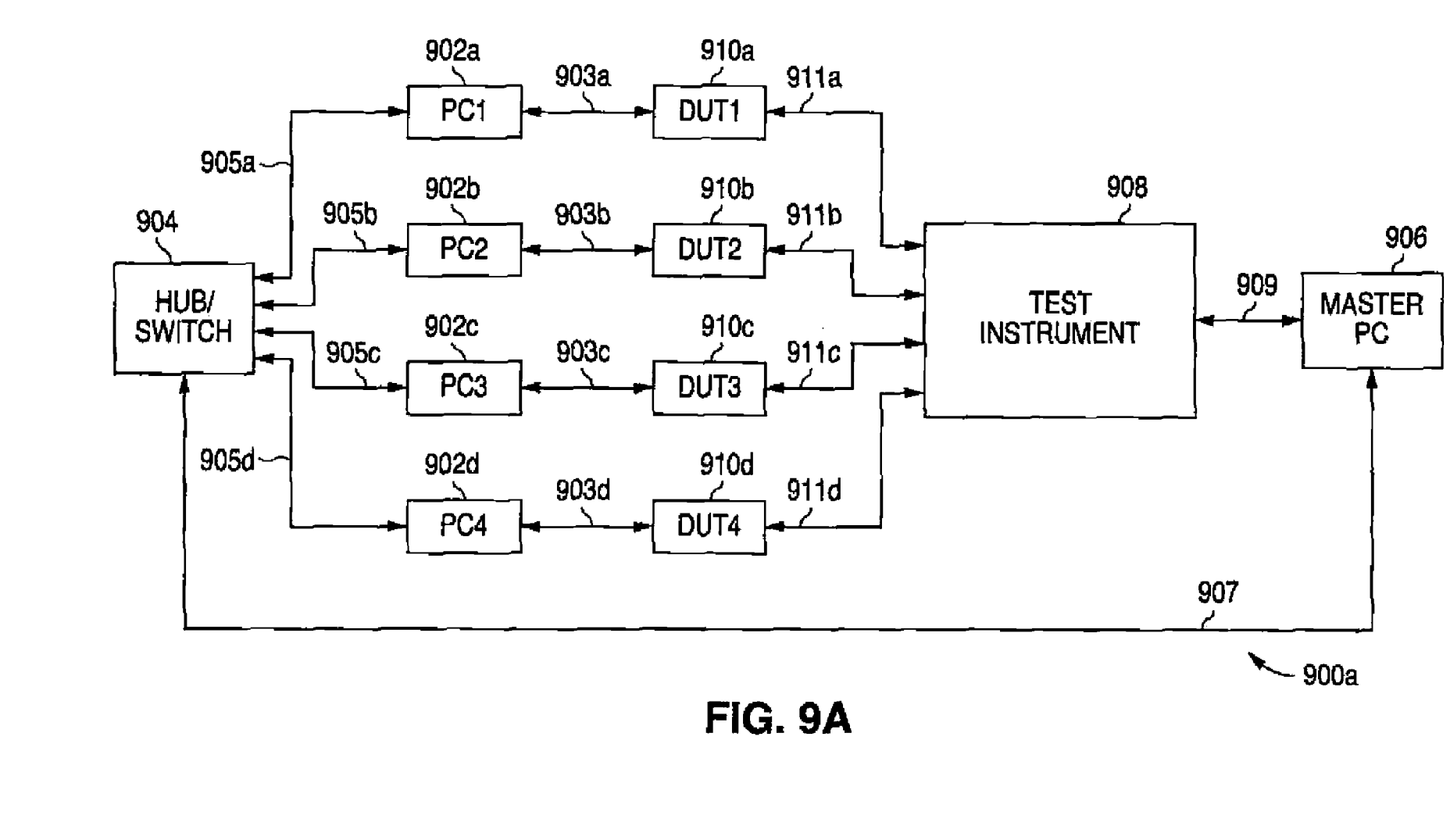
FIGS. 9A and 9B are functional block diagrams of test systems in accordance with further embodiments of the presently claimed invention.
Figure 9B:
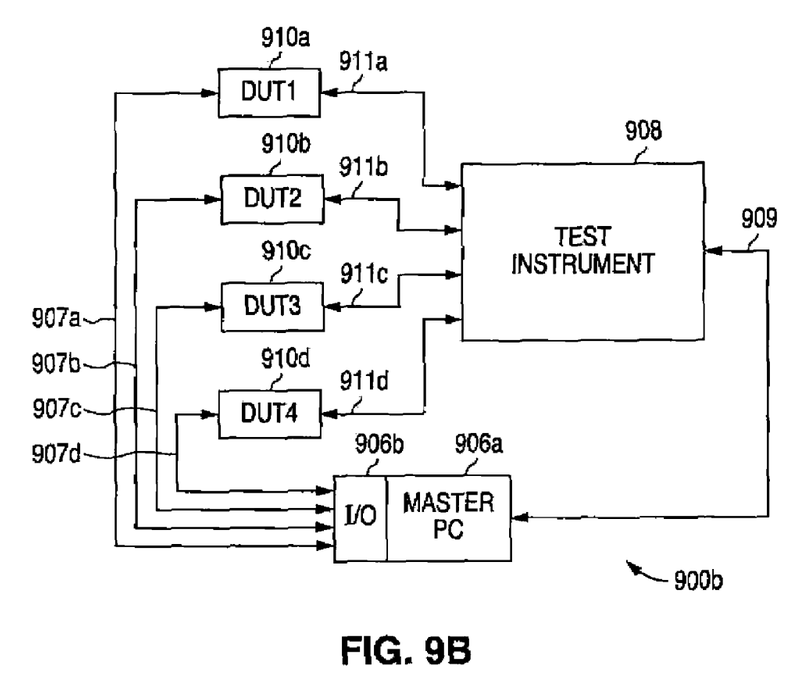

Referring to FIGS. 9A and 9B, in accordance with the presently claimed invention, a reduction in test time can be achieved by measuring multiple DUTs in parallel using a single test instrument. The DUTs are operated in parallel and controlled substantially simultaneously by sending the same control and test signals to the various DUTs from a single source. This will ensure that the DUTs operate in a substantially synchronized manner. Additionally, it should be possible to use multiple packet testing with such a parallel test system.

The system 900*a* of FIG. 9A includes multiple DUT controllers 902*a*, 902*b*, 902*c*, 902*d* (e.g., individual personal computers), a hub or switch 904, a master controller 906 (e.g., another personal computer), and the test instrument 908, all interconnected substantially as shown to drive and test the DUTs 910*a*, 910*b*, 910*c*, 910*d*. The test instrument 908 includes receiver and decoding circuitry for testing the DUTs 910*a*, 910*b*, 910*c*, 910*d* in their transmit modes of operation, and also includes encoding and transmitter circuitry for testing for testing the DUTs 910*a*, 910*b*, 910*c*, 910*d* in their receive modes of operation. (Examples of such test instruments can be found in U.S. patent application Ser. No. 10/770,020, filed Feb. 2, 2004, entitled "Integrated Radio Frequency (RF) Tester", and U.S. patent application Ser. No. 10/770,298, filed Feb. 2, 2004, and entitled "Distributed Test Equipment System For Testing Analog Communications Systems", the disclosures of which are incorporated herein by reference.)

When testing the DUTs 910*a*, 910*b*, 910*c*, 910*d* in their transmit modes of operation, as discussed above, the master controller 906 provides control signals 907 to the hub or switch 904 which relays respective control information 905*a*, 905*b*, 905*c*, 905*d* (which may be identical or distinct) to the DUT controllers 902*a*, 902*b*, 902*c*, 902*d*. In turn, these controllers 902*a*, 902*b*, 902*c*, 902*d* provide control signals and test data 903*a*, 903*b*, 903*c*, 903*d* to their respective DUTS 910*a*, 910*b*, 910*c*, 910*d*. As discussed in more detail below, the DUTs 910*a*, 910*b*, 910*c*, 910*d* provide the packet data signals 911*a*, 911*b*, 911*c*, 911*d*, which are selectively captured and processed by the test instrument 908 to provide captured test data 909 to the master controller 906. The master controller 906 then sends this captured test data as part of the data 907 sent to the DUT controllers 902*a*, 902*b*, 902*c*, 902*d*, via the hub or switch 904, for analysis. In other words, each DUT controller 902*a*, 902*b*, 902*c*, 902*d* provides the test data to its respective DUT 910*a*, 910*b*, 910*c*, 910*d*, and analyzes the captured test data corresponding to that DUT for analysis in view of the original test data.

When testing the DUTs 910*a*, 910*b*, 910*c*, 910*d* in their receive modes of operation, the master controller 906 provides data and control signals 909 to the test instrument 908 which transmits packet data signals 911*a*, 911*b*, 911*c*, 911*d* to the DUTs 910a, 910b, 910c, 910d. In turn, the DUTs 910a, 910b, 910c, 910d provide the resulting data packets for analysis to the DUT controllers 902a, 902b, 902c, 902d which provide their analysis data 905a, 905b, 905c, 905d for conveyance as one or more data signals 907 to the master controller 906 via the hub or switch 904.

The alternative system 900b of FIG. 9B uses a single controller 906a having an input/output section 906b capable of receiving and transmitting the multiple DUT signals 907a, 907b, 907c, 907d (e.g., multiple RS232 or USB serial ports).

By testing multiple DUTs in systems 900a, 900b such as these, the individual DUTs can be controlled individually and synchronized after each testing step. This avoids trying to control the DUTs with a single control signal, which would make calibration difficult since the individual DUTs being tested cannot be assumed to be identical and, therefore, requiring individual calibration procedures. While complete synchronous operation cannot necessarily be assumed, e.g., the data packets may not be transmitted at exactly the same time, the DUTs will be performing the needed operations for a specific test during a common time interval. While this can complicate the testing to some degree, this can be handled by controlling the DUTs using multiple DUT controllers, as depicted in FIG. 9A or using a single controller with multiple drive capability, as depicted in FIG. 9B.

As noted above, maximum test equipment usage is desired, so using a dedicated test instrument for each DUT is not desirable. However, as also noted above, since relatively little time is needed to perform the actual data capture, it is possible to interleave the capturing of the various data packets from the various DUTs, thereby making the data capture appear to be happening in parallel.

Interleaving of the captured data packets can be achieved by using signal switching circuits as described above for FIGS. 5A and 5B as part of the front end of the test instrument 908.

Another alternative embodiment may be implemented in which one of the DUT controllers 902a also serves as the master controller, wherein such controller 902a would communicate directly with the test instrument 908 and control the remaining DUT controllers 902b, 902c, 902d either via the hub 904 or through a multiple output interface (e.g., RS232 or USB serial interfaces). In still another alternative embodiment, the master controller 906 may be integrated as part of the test instrument 908, in which case the test instrument 908 will communicate directly with the hub 904. In yet another alternative embodiment, the master controller 906 may wait for requests from the DUT controllers 902a, 902b, 902c, 902d before sending the captured test data via the hub or switch 904 for analysis, thereby allowing the DUT controllers 902a, 902b, 902c, 902d to finish other operations and otherwise prepare themselves.

Figure 10A:
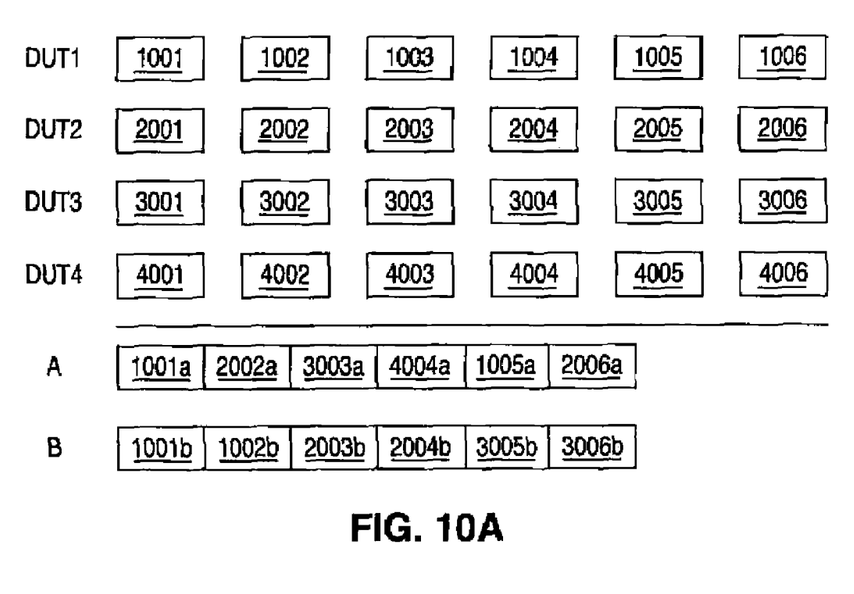
FIGS. 10A, 10B and 10C are diagrams depicting methods of capturing data packets for analysis in accordance with additional embodiments of the presently claimed invention.

Referring to FIG. 10A, a data packet capture process in accordance with one embodiment of the presently claimed invention can be implemented as follows. Each DUT 910a, 910b, 910c, 910d (FIGS. 9A and 9B) transmits a data packet train 1001-1006, 2001-2006, 3001-3006, 4001-4006. According to one implementation, each DUT transmits the same type of data packets, but it will be readily understood that distinct data packets can be transmitted since the downstream data analysis program will know what has been captured for analysis. In this example, two data capture sequences A, B are discussed.

In the first capture sequence A, the test instrument 908 captures data packet 1001 from the first DUT 910a and stores it in analysis memory as data packet 1001a. This stored data may be the full transmitted data packet or a desired subset thereof. This is followed by capturing of data packet 2002 from the second DUT 910b, which is stored as data packet 2002a. In turn, this is followed by capturing of data packet 3003 from the third DUT 910c and storing it as data packet 3003a, and capturing of data packet 4004 from the fourth DUT 910d and stored as data packet 4004a. In the event that averaging is needed, the test instrument 908 will then capture the data packet 1005 from the first DUT 910a and store it as data packet 1005a, followed by a capture of data packet 2006 from the second DUT 910b and storing it as data packet 2006a. This sequence will be repeated until the desired number of data packets from each DUT has been captured. In the event that it is not possible to switch quickly enough between data packets, the capturing process can skip data packets so that non-consecutive packets are captured. However, the general sequence remains the same, with the interleaved packets having been captured from different DUTs.

According to the second sequence B, rather than interleaving one data packet at a time, multiple packets can be captured before switching to the next DUT. For example, the capture sequence may start by capturing data packet 1001 and 1002 from the first DUT 910a and storing them as data packets 1001b and 1002b. As discussed above, the capture process can remove unwanted portions of the captured data so that only required information is captured and stored. Following this, two data packets 2003, 2004 from the second DUT 910b are captured and stored as data packets 2003b, 2004b, followed then by capture of two data packets 3005, 3006 from the third DUT 910c which are stored as data packets 3005b, 3006b, and so on. This data capture sequence may be more advantageous if it takes a relatively long time to switch the input among the DUTs, and requires fewer switching operations.

As should be understood from the foregoing discussion, many different data capturing sequences can be used, with the common characteristic being the interleaving of data from different DUTs into a single data capture operation. Two possible considerations in capturing multiple data packets from each DUT include possible thermal issues arising from longer time intervals between testing of each DUT, and longer data transfer intervals when more data packets are captured from each DUT.

Figure 10B:
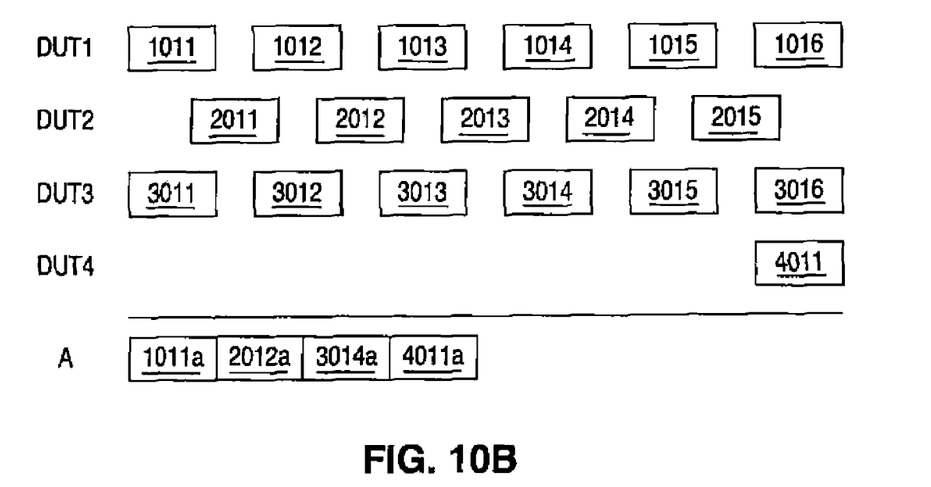

Referring to FIG. 10B, an example of a data capture process in which the incoming data packets are not well synchronized is presented. As shown, the data packet streams are not synchronized, i.e., they do not begin at the same point in time (time being along the horizontal axis). The data packets 1011-1016 from the first DUT 910a appear approximately synchronous with the data packets 3011-3016 from the third DUT 910c, but the data packets 2011-2015 from the second DUT 910b are delayed, while the first data packet 4011 from the fourth DUT 910d is significantly delayed. According to the example capture process A shown, the first captured data packet 1011 is from the first data packet stream and is stored as data packet 1011a. In this example, the switching among the data packet streams is sequential, i.e., beginning with the first DUT output 911a and progressing sequentially to the last DUT output 911d. Following capture of the first data packet 1011, the next data packet 2011 has already started, so the capture process waits to capture the next data packet 2012 from the second DUT 910b and stores is as data packet 2012a (thereby avoiding the capture of only a portion of the first data packet 2011). For the next data packet capture, as before, the capturing sequence waits until the beginning of the next full data packet, thereby capturing data packet 3014 and storing it as data packet 3014a. Accordingly, for the next data packet, i.e., from the fourth DUT 910d, the first available data packet

4011 is captured and stored as data packet 4011a. By capturing data packets in this manner, i.e., by suspending the data capture process if a data packet has already been partially received and waiting until the beginning of the next data packet, false triggering can be avoided and more reliable test data can be captured for analysis.

Figure 10C:
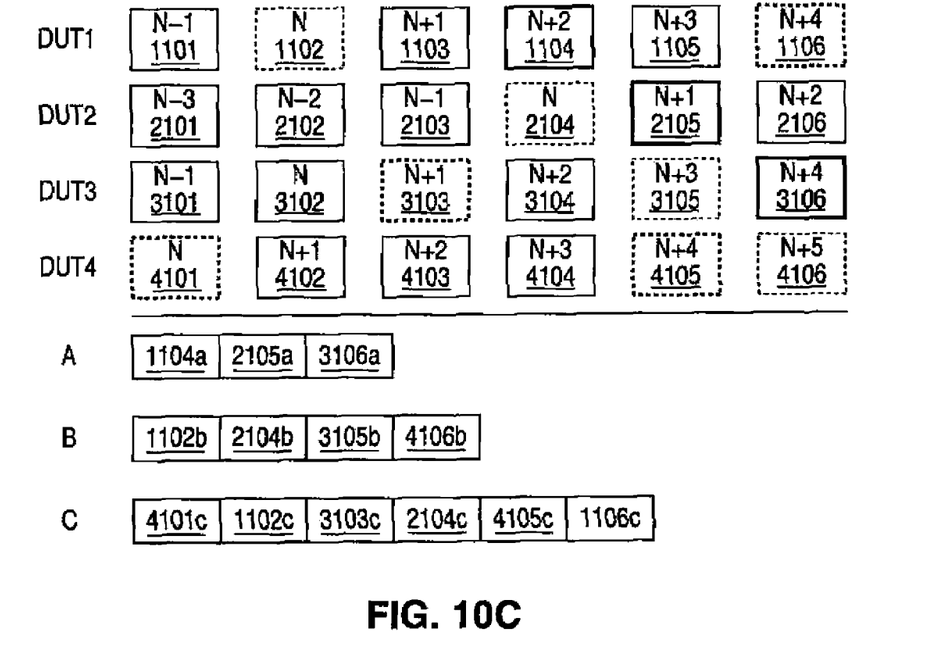

Referring to FIG. 10C, in another alternative data capture sequence, capturing of data is not intended to begin until after N packets have been transmitted by the DUT so as to ensure proper settling (e.g., of the DUT operating conditions). While this can be measured in time, it is often more reliable to measure based on the number of data packets, particularly as many as closed loop power control techniques are updated based on the number of data packets more often than simply measuring time. In this example, three data capture sequences A, B, C are presented.

As can be seen, the fourth DUT 910d will be the first DUT to have transmitted N data packets upon the transmission of data packet 4101, followed by the third DUT 910c upon transmission of data packet 3102, followed by the first DUT 910a upon transmission of data packet 1102, followed by the second DUT 910b upon transmission of data packet 2102. In the first example data capture sequence A, data capture begins after all DUTs have sent N data packets or more. Accordingly, if data capture begins with the first DUT 910a, then data packets 1104, 2105 and 3106 are captured and stored as data packets 1104a, 2105a, and 3106a, respectively. (A fourth data packet from the fourth DUT 910d is also captured and stored, but is not identified in the figure). Accordingly, data capture begins upon detection of the Nth data packet arriving from the last of the DUTs having transmitted N data packets, i.e., data packet 2104 in this example. Alternatively, rather than initiating the data capture sequence based on simple power detection, some logic could be employed to begin capturing data when the first DUT has sent data packet N, the second DUT has sent data packet N-1, the third DUT has sent data packet N-2, and the fourth DUT has sent data packet N-3, since by the time the earlier data packets have been captured, N data packets would have been sent by all DUTs.

In the second example data capture sequence B, data packets from the first DUT 910a are captured as soon as it has sent N data packets, whereafter the control logic monitoring the power detectors (FIGS. 5A and 5B) waits until the second DUT 910b has transmitted N or more data packets, and so on. As a result, the data packets 1102, 2104, 3105, and 4106 are captured and stored as data packets 1102b, 2104b, 3105b, and 4106b, respectively.

According to the third example sequence C, all of the data packet signals 911a, 911b, 911c, 911d are monitored in parallel and data capture begins once an input has received N data packets. As a result, data packets 4101, 1102, 3103, 2104, 4105, and 1106 are captured and stored as data packets 4101c, 1102c, 3103c, 2104c, 4105c, and 1106c, respectively. This sequence C uses a second data capture to achieve averaging. In this type of sequence, the front end control logic (FIGS. 5B and 5B) will provide information for the analysis software (within the DUT controllers 902a, 902b, 902c, 902d) regarding from which input a specific data packet originates. It will be readily apparent to one of ordinary skill in the art that additional data capture sequences can be implemented. For example, if one DUT begins transmitting a long time before the remaining DUTs, all of its data packets may be captured before progressing on to capturing data from any of the remaining DUTs.

Based upon the foregoing, it will be readily appreciated that testing multiple data steams by capturing and interleaving data packets from the various data streams can also be used for testing MIMO DUTs. For example, in the systems 900a, 900b of FIGS. 9A and 9B, the first DUT 910a can be a MIMO DUT for which all of its output signals have been combined (e.g., using a signal summing circuit) to produce a composite packet data signal 911a. Alternatively, in the example embodiments 900, 900b of FIGS. 9A and 9B where the test instrument 908 accepts four input signals, if each MIMO DUT has two outputs the four single-output DUTs 910a, 910b, 910c, 910d can be replaced by two dual-output MIMO DUTs.

While the foregoing discussion primarily addresses testing of the DUTs 910a, 910b, 910c, 910d in their transmit modes of operation, it will be readily appreciated that the systems 900a, 900b of FIGS. 9A and 9B advantageously provide for testing the DUTs 910a, 910b, 910c, 910d in their receive modes of operation as well. For example, the master controller 906 instructs the test instrument 908 to transmit multiple packet data signals 911a, 911b, 911c, 911d in parallel to the DUTs 910a, 910b, 910c, 910d, e.g., as a packet data signal which is distributed via a signal splitter and switches similar to the circuitry of FIG. 5A with all switches in their closed states. Such parallel testing provides at least two advantages over serial testing in which one DUT is tested at a time. One advantage is less test time is required since multiple DUTs can be tested in the time it would otherwise take to test one (e.g., test time reduced by a factor of four when testing four DUTs), plus the switching circuitry need not be reconfigured between tests. A second advantage is minimizing the chance that an unintended DUT (i.e., one for which its signal switch is open but its receiver is enabled) receives and counts data packets that are sent to another DUT but inadvertently coupled into its signal path, particularly if the signals are at higher levels. Since each DUT is receiving a signal intended for it, such intended signal will be significantly stronger than any inadvertently coupled (i.e., crosstalk) signal so its data packets will be properly received and counted.

In yet another embodiment, the DUTs 910a, 910b, 910c, 910d can be tested in their receive modes of operation by having the master controller 906 instruct the test instrument 908 to transmit a test packet which when received causes each DUTs 910a, 910b, 910c, 910d to transmit in return an acknowledgement (ACK) packet. Such acknowledgement packets can be detected individually by respective power detectors (FIG. 5A), thereby allowing the acknowledgement packets to be counted individually. After all expected acknowledgement packets have been counted as received, testing can be continued by having the test instrument 908 transmit another test packet to repeat this process.

Various other modifications and alternations in the structure and method of operation of this invention will be apparent to those skilled in the art without departing from the scope and the spirit of the invention. Although the invention has been described in connection with specific preferred embodiments, it should be understood that the invention as claimed should not be unduly limited to such specific embodiments. It is intended that the following claims define the scope of the present invention and that structures and methods within the scope of these claims and their equivalents be covered thereby.

What is claimed is:

1. An apparatus including a system for testing a plurality of packet data transmitters, comprising:
   a plurality of device-under-test (DUT) controllers each of which is programmed to provide, responsive to a plurality of control data, a respective one of multiple pluralities of transmit data to a respective one of a plurality of DUTs and further programmed to analyze a respective one of multiple pluralities of test data related to said respective one of multiple pluralities of transmit data, wherein said plurality of DUTs, responsive to said multiple pluralities of transmit data, provides a plurality of packet data signals each of which contains at least a portion of a respective one of said multiple pluralities of transmit data;

a data signal capturing system responsive to a reception of said plurality of packet data signals by capturing at least a portion of each one of said plurality of packet data signals to provide a plurality of captured data packets; and a master controller coupled to said data signal capturing system and said plurality of DUT controllers, and programmed to provide said plurality of control data and to process said plurality of captured data packets to provide said multiple pluralities of test data;

wherein each one of said plurality of DUT controllers determines an operational status of said respective one of said plurality of DUTs based upon said analysis of said respective one of said multiple pluralities of test data in view of said respective one of said multiple pluralities of transmit data.

2. The apparatus of claim 1, wherein each one of said plurality of DUT controllers comprises a computer.

3. The apparatus of claim 1, wherein said data signal capturing system comprises signal switching and detection circuitry responsive to a plurality of control signals and said reception of said plurality of packet data signals by providing one or more detection signals indicative of reception of one or more of said plurality of packet data signals and by capturing said at least a portion of each one of said plurality of packet data signals to provide said plurality of captured data packets; and control circuitry coupled to said signal switching and detection circuitry, and responsive to said one or more detection signals by providing said plurality of control signals.

4. The apparatus of claim 1, wherein said master controller comprises:

a computer coupled to said data signal capturing system and programmed to provide said plurality of control data and to process said plurality of captured data packets to provide said multiple pluralities of test data; and a signal hub coupled to said computer and said plurality of DUT controllers to convey said plurality of control data and said multiple pluralities of test data.

5. An apparatus including a system for testing a plurality of packet data transmitters, comprising:

device-under-test (DUT) controller means for providing, responsive to a plurality of control data, a respective one of multiple pluralities of transmit data to a respective one of a plurality of DUTs and for analyzing a respective one of multiple pluralities of test data related to said respective one of multiple pluralities of transmit data, wherein said plurality of DUTs, responsive to said multiple pluralities of transmit data, provides a plurality of packet data signals each of which contains at least a portion of a respective one of said multiple pluralities of transmit data;

data signal capturing means for responding to a reception of said plurality of packet data signals by capturing at least a portion of each one of said plurality of packet data signals to provide a plurality of captured data packets; and master controller means for providing said plurality of control data and processing said plurality of captured data packets to provide said multiple pluralities of test data;

wherein said DUT controller means determines an operational status of said respective one of said plurality of DUTs based upon said analysis of said respective one of said multiple pluralities of test data in view of said respective one of said multiple pluralities of transmit data.

6. An apparatus including a system for testing a plurality of packet data transmitters, comprising:

a data signal capturing system responsive to a reception of a plurality of packet data signals by capturing at least a portion of each one of said plurality of packet data signals to provide a plurality of captured data packets; and a controller programmed to provide respective ones of multiple pluralities of transmit data to respective ones of a plurality of DUTs, to process said plurality of captured data packets to provide multiple pluralities of test data related to said respective ones of multiple pluralities of transmit data, and to analyze respective ones of said multiple pluralities of test data;

wherein said plurality of DUTs, responsive to said multiple pluralities of transmit data, provides said plurality of packet data signals each of which contains at least a portion of a respective one of said multiple pluralities of transmit data, and said controller determines an operational status of each one of said plurality of DUTs based upon said analysis of said respective one of said multiple pluralities of test data in view of said respective one of said multiple pluralities of transmit data.

7. The apparatus of claim 6, wherein said data signal capturing system comprises signal switching and detection circuitry responsive to a plurality of control signals and said reception of said plurality of packet data signals by providing one or more detection signals indicative of reception of one or more of said plurality of packet data signals and by capturing said at least a portion of each one of said plurality of packet data signals to provide said plurality of captured data packets; and control circuitry coupled to said signal switching and detection circuitry, and responsive to said one or more detection signals by providing said plurality of control signals.

8. The apparatus of claim 6, wherein said controller comprises a computer.

9. An apparatus including a system for testing a plurality of packet data transmitters, comprising:

data signal capturing means for responding to a reception of a plurality of packet data signals by capturing at least a portion of each one of said plurality of packet data signals to provide a plurality of captured data packets; and controller means for providing respective ones of multiple pluralities of transmit data to respective ones of a plurality of DUTs, for processing said plurality of captured data packets to provide multiple pluralities of test data related to said respective ones of multiple pluralities of transmit data, and for analyzing respective ones of said multiple pluralities of test data;

wherein said plurality of DUTs, responsive to said multiple pluralities of transmit data, provides said plurality of packet data signals each of which contains at least a portion of a respective one of said multiple pluralities of transmit data, and said controller means determines an operational status of each one of said plurality of DUTs based upon said analysis of said respective one of said multiple pluralities of test data in view of said respective one of said multiple pluralities of transmit data.

10. A method for testing a plurality of packet data transmitters, comprising:

providing respective ones of multiple pluralities of transmit data for respective ones of a plurality of devices-under-test (DUTs);

providing, with said plurality of DUTs in response to said multiple pluralities of transmit data, a plurality of packet data signals each of which contains at least a portion of a respective one of said multiple pluralities of transmit data;

capturing at least a portion of each one of said plurality of packet data signals to provide a plurality of captured data packets;

processing said plurality of captured data packets to provide multiple pluralities of test data each of which is related to a respective one of said multiple pluralities of transmit data; and analyzing respective ones of said multiple pluralities of test data in view of respective ones of said multiple pluralities of transmit data to determine an operational status of respective ones of said plurality of DUTs.

* * * * *